Patented Oct. 14, 1947

2,429,033

UNITED STATES PATENT OFFICE 2,429,033

SOLDERING FLUX

Harold Silman and Walter Stein, Birmingham, England, assignors to Joseph Lucas Limited, Birmingham, England No Drawing. Application April 6, 1943, Serial No. 482,056. In Great Britain May 30, 1942

1 Claim. (Cl. 148—25)

This invention has for its object to provide an improved soldering flux adapted for use more particularly in the soldering of metal parts intended to carry electric currents.

The invention consists of a rosin flux having incorporated with it from about 0.2% to about 8% of cetyl pyridinium bromide.

In one manner of carrying the invention into effect we employ as the basic substance of our improved flux a solution of about 24% of colophony in alcohol. To this is added a small quantity of cetyl pyridinium bromide. About 1% of this latter substance is suitable for many purposes, but the proportion may be varied between the limits of about 0.2% to about 2%. But for some purposes, as for example, when the flux is required to be used in what are known as cored solders, that is to say, hollow rods of soldering metal charged with flux, the upper limit may be increased substantially above the said limit of about 2%, and may be made as high as about 8%.

A flux used in effecting a soldered connection between metal parts intended to carry an electric current should not only ensure the required free spreading of the molten solder in the soldering operation (an action sometimes referred to as wetting) but also minimize risk of corrosion subsequently occurring at the connection. To avoid this risk of corrosive action it is usual to employ a simple rosin flux when making soldered connections between such metal parts, but such a flux is not entirely satisfactory on account of its low "spreading" power. Various additions have already been made to rosin fluxes to increase their "spreading" power, but they have not been entirely satisfactory on account of the risk of subsequent corrosion. Hitherto therefore there has been a need for a rosin flux which will meet both of the conditions abovementioned, and this need is effectively met by our present invention. The invention is especially useful in the soldering of metal parts made from electroplated sheets or strips.

Having thus described our invention, what we do claim as new and desire to secure by Letters Patent is:

A rosin soldering flux having incorporated with it from about 0.2% to about 8% of cetyl pyridinium bromide.

HAROLD SILMAN.
WALTER STEIN.

REFERENCES CITED

The following references are of record in the file of this patent:

UNITED STATES PATENTS

| Number | Name | Date |
|---|---|---|
| 319,128 | Rosenberg | June 2, 1885 |
| 1,744,784 | McDonough | Jan. 28, 1930 |
| 1,929,895 | McBride | Oct. 10, 1933 |
| 1,981,292 | Todd | Nov. 20, 1934 |
| 1,989,557 | Muller | Jan. 29, 1935 |

FOREIGN PATENTS

| Number | Country | Date |
|---|---|---|
| 379,396 | Great Britain | Sept. 1, 1932 |